United States Patent [19]
Juergens, III

[11] Patent Number: 5,497,060
[45] Date of Patent: Mar. 5, 1996

[54] POSITIONING STAGE

[76] Inventor: Albert M. Juergens, III, Box 114B-1, Huntersfield Rd., Prattsville, N.Y. 12468

[21] Appl. No.: 79,401

[22] Filed: Jun. 21, 1993

[51] Int. Cl.⁶ ............................. G02B 21/26; B23Q 16/00
[52] U.S. Cl. .................... 318/563; 318/652; 364/167.01; 359/393; 33/1 M; 269/61
[58] Field of Search ...................... 318/575, 603, 318/602, 640, 605, 563, 625, 568.24, 630, 574, 652, 600, 653, 601, 687; 269/55, 56, 61, 58; 359/368, 382, 384, 391, 392, 393; 364/167.01; 250/440.11, 442.11, 491.1; 414/225, 744.2, 744.3; 33/1 M

[56]       References Cited
U.S. PATENT DOCUMENTS

3,715,645  2/1973  Viret et al. ........................... 318/603
4,052,603  10/1977 Karlson .
4,233,740  11/1980 Bunn et al. ............................. 33/1 A
4,345,836  8/1982  Phillips ..................................... 355/53
4,447,731  5/1984  Kuni et al. ........................... 250/442.1
4,568,188  2/1986  Weber et al. .
4,627,009  12/1986 Holmes et al. ......................... 364/559
4,835,704  5/1989  Eichelberger et al. .
4,938,654  7/1990  Schram .................................. 414/757
5,337,140  8/1994  Hagiwara et al. .

*Primary Examiner*—Bentsu Ro
*Attorney, Agent, or Firm*—Charles J. Brown

[57]            ABSTRACT

A positioning stage wherein encoder pair means on a table which is movable on a frame by a drive and transmission system generate a signal independent of lost motion in that system so that a microprocessor can fix the position of the table in a predetermined position with respect to the frame irrespective of that lost motion.

12 Claims, 9 Drawing Sheets

POSITIONING STAGE

BACKGROUND OF THE INVENTION

Positioning stages, as that term is used herein, are devices for moving a table with respect to a frame within at least one and usually more than one predetermined degree of freedom by a drive through a motion transmission system so that the table can be placed in a fixed predetermined position with respect to the frame. An example of a positioning stage is described in U.S. Pat. No. 4,766,465.

Highly refined positioning stages are well known for optical microscopes, specifically for moving a work piece mounting table along X and Y axes to bring the work piece to the desired predetermined position in the optical system. Examples of microscope positioning stages are disclosed in U.S. Pat. Nos. 5,077,620, 5,000,554 and 4,824,229.

It is well known to sense changes of relative position between two movable parts by the use of electronic encoders which send a signal, typically a quadrature encoded signal, to a microprocessor to indicate when changes of position between the two parts have occurred. The microprocessor then activates one or more drive mechanisms to return the parts to the predetermined fixed position or to move them to a different predetermined fixed position. Encoder pairs are described in each of the three patents identified above. In each of those instances, and in all other known designs, encoder pairs sense relative movement within the parts of one or more of the drive motors or of the motion transmission systems such as gear trains.

In every such case there is a probability of some lost motion in the motion transmission system between that sensing point of the encoder pairs and the table which requires positioning, and it could result in undetected and therefore uncontrolled motion of the table. To guard against this undesirable result prior art designs have uniformly resorted to high precision gearing and the use of relatively expensive stepped electric motors, all of which are carefully crafted to eliminate play, slop or other lost motion in the motion transmission system between the place of operation of the encoder pair and the table to be positioned. Inexpensive small direct current electric motors, non-precision hydraulic motors or cylinders and loose tolerance gear trains have not been employable on microscopic positioning stages or any other positioning stages where relatively fine positioning is required for the work table.

It is the principal purpose of the present invention to improve upon positioning stages so that encoder pairs may accurately fix a work piece on a table in a predetermined position irrespective of lost motion in the transmission system between the drive of the stage and the work table. This object is to be achieved even when the work table operates within a plurality of degrees of freedom with a plurality of motion transmission systems involved. Specifically, it is the purpose of the invention to provide a microscope positioning stage using inexpensive electric or hydraulic devices and gear trains which incorporate encoder pairs and microprocessors in a manner such that a work table can be positioned within an accuracy of five microns plus or minus.

SUMMARY OF THE INVENTION

The invention is an improvement in a positioning stage wherein the table is movable with respect to a frame within at least one predetermined degree of freedom by a drive through a motion transmission system with lost motion therebetween. The improvement comprises encoder pair means on the table and frame for sensing motion of the table directly in reference to the frame and generating a signal indicating such motion independent of lost motion in the drive and transmission system. Microprocessor means are included which are responsive to the encoder means signal for operating the drive to fix the table in a predetermined position with respect to the frame irrespective of lost motion in the drive and transmission systems.

The drive may be an electric motor and the motion transmission system may be a gear train, specifically one which includes rack-and-pinion and worm-and-wheel gears. Alternatively the drive may be a hydraulic pump and the motion transmission system may be either hydraulic motors or hydraulic cylinders.

The table may be movable back and forth along at least two of straight linear, curvilinear or angular travel paths. When the travel paths are straight linear the table may be movable with respect to the frame within at least two degrees of freedom along perpendicular X and Y axes. Another degree of freedom along a travel path which is angular about an axis of rotation may also be included.

There may be a slide translatable with respect to the frame along a straight linear travel path, with the table translatable on the slide along a second straight linear travel path. A first drive for the slide and a second drive for the table may both be mounted on the slide.

Adjustable pressure bearing means may be associated with the slide for guiding the slide and preventing loss of placement of the table at its predetermined position with respect to the frame. Resilient bearing spacers may be included between the frame and the slide and between the slide and the table. There may be a first slide translatable on a frame along a first straight linear travel path, a second slide translatable on the first slide along a second linear travel path perpendicular to said first travel path and forming X and Y axes therewith and the table may be rotatable on the second slide along an angular travel path.

DESCRIPTION OF PREFERRED EMBODIMENT

Figure 1:
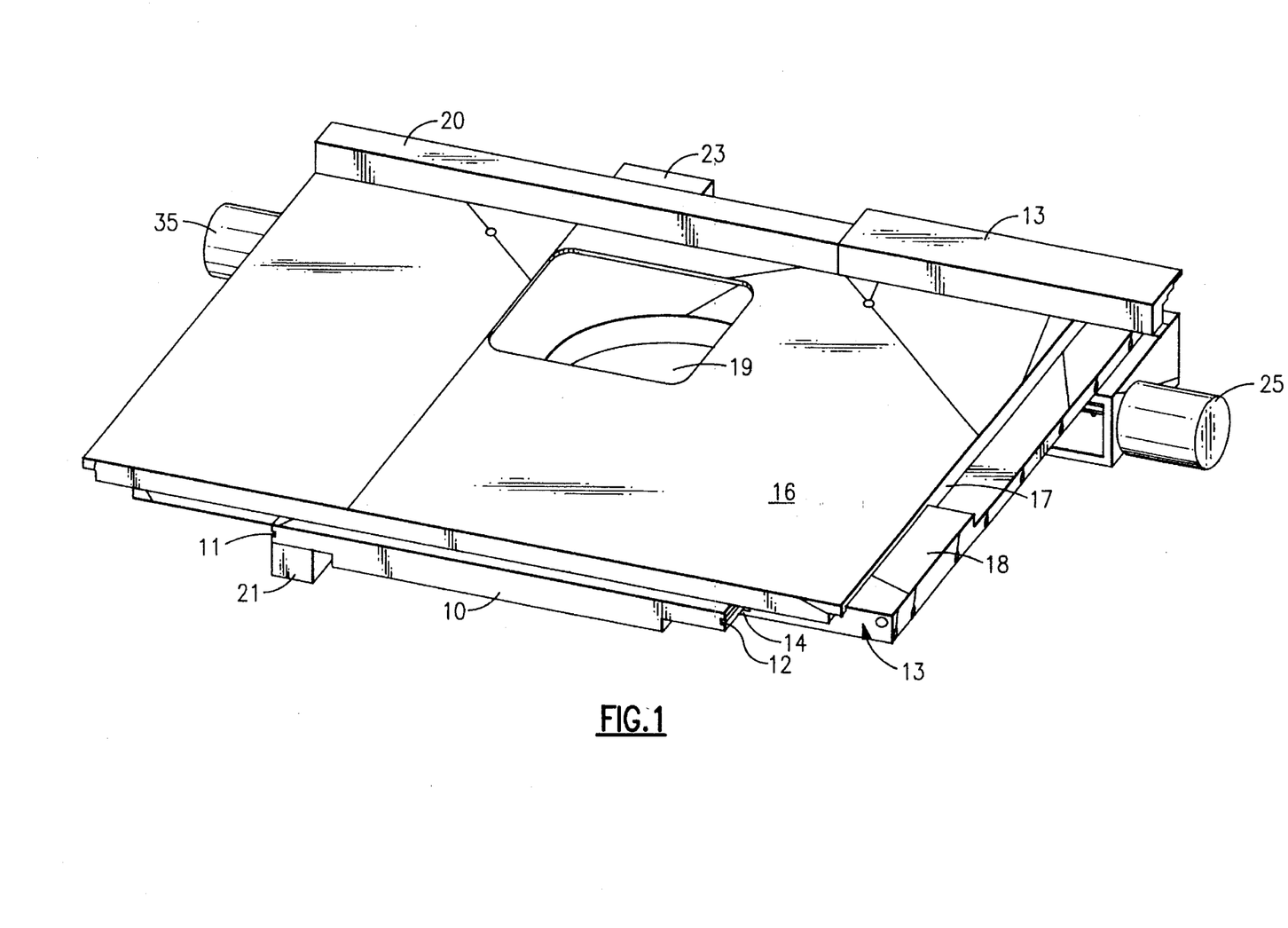
FIG. 1 is a perspective view a first embodiment of the positioning stage of the invention for a microscope wherein a first slide and a table are translatable along perpendicular X and Y axes by electric motors and gear trains.

Referring first to FIG. 1 an optical microscope not otherwise shown includes a fixed frame 10 having straight parallel sides 11 and 12. Movably mounted on the frame 10 is a positioning stage comprising two parts. The first is a slide 13 having straight parallel inwardly facing side edges 14 (one is visible in FIG. 1) which are opposed to the edges 11 and 12 of the frame 10. Straight linear translation of the slide 13 back and forth along the frame 10 is referred to herein as movement along an X axis. The second part of the positioning stage is a table 16 which has a shoulder 17 restrained against a corresponding upwardly facing shoulder 18 on the slide 13. The table 16 is translatable back and forth on the slide 13 along what is referred to herein as a Y axis perpendicular to the direction of translation of the slide 13 on the frame 10. Thus the positioning stage of FIG. 1 provides movement of the table 16 with respect to the frame 10 within two predetermined degrees of freedom along first and second straight linear travel paths forming X and Y axes therewith. The frame 10, the slide 13 and the table 16 together define a microscope condenser clearance hole 19 which is also that position on the table 16 where a work piece is locating during operation.

Mounted along the rear edge portion of the table 16 is an X axis linear position encoder strip 20. Mounted on the left underside edge of the frame 10 is a Y axis linear position encoder strip 21. Each of the X axis encoder strips 20 and 21 is paired with an encoder station 23 mounted on the slide 13. Quadrature encoded signals are generated by each of the X axis encoder pair 20–23 and the Y axis encoder pair 21–23 to indicate movement of the table 16 along the X and Y axes respectively of as little as five microns plus or minus.

Figure 2:
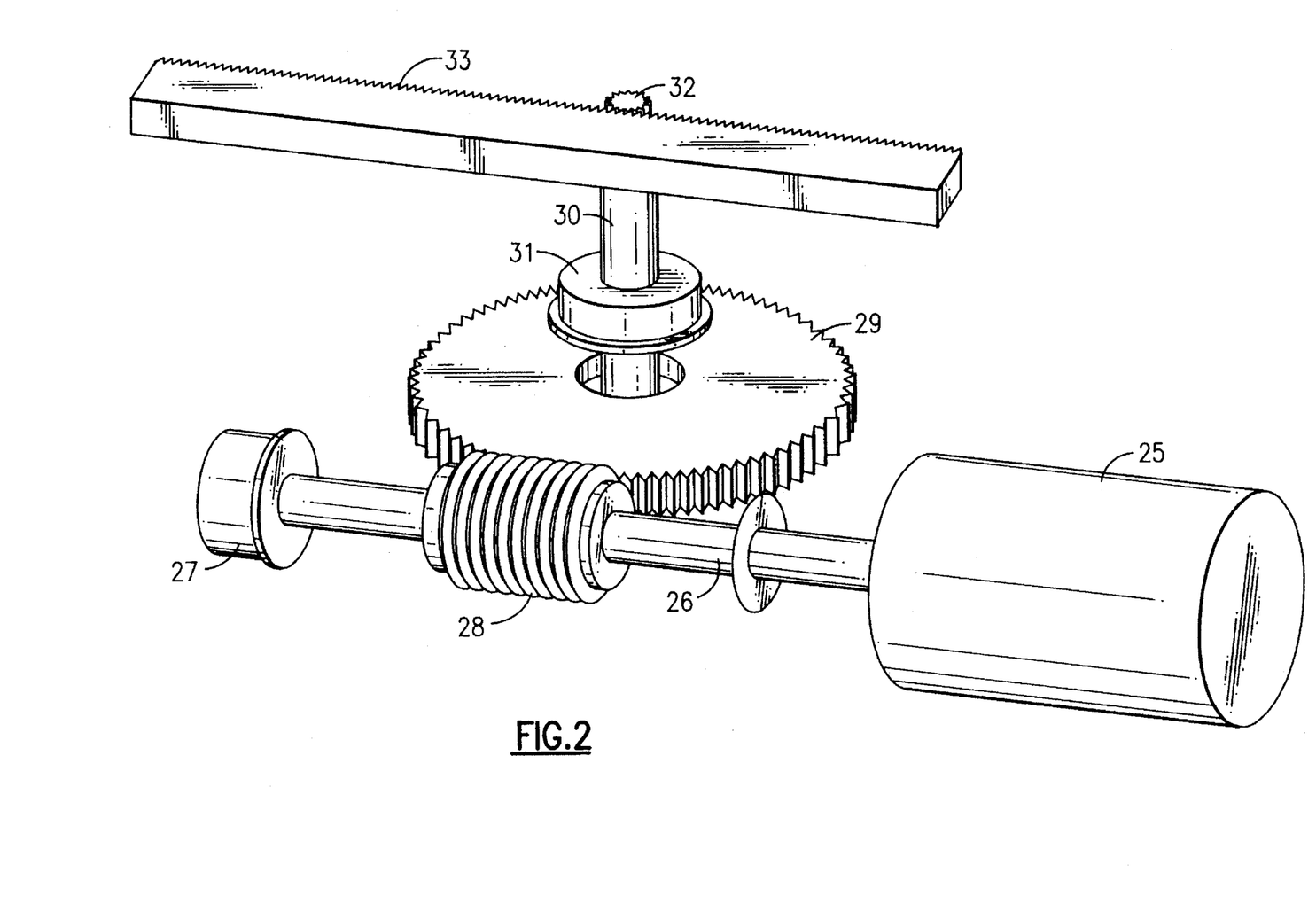
FIG. 2 is an enlarged fragmentary perspective of the gear train for the X axis slide of the FIG. 1 positioning stage.

Referring now to FIG. 2, the X axis drive and its motion transmission system is shown in detail. It consists of a relatively inexpensive and simple direct current electric motor 25 which is far less costly and complicated as the stepped motors typically used in the microscope positioning stages of the prior art. The motor 25 has a drive shaft 26 mounted at its remote end in a bearing 27 and having worm gear 28 which meshes with a worm wheel 29 driving a pinion shaft 30 mounted in a bearing 31. The motor 25 and its shaft 26 and bearing 27, the worm gear 28 and worm wheel 29, and the shaft 30 and bearing 31 are all mounted on the slide 13 as shown in FIG. 1. A pinion gear 32 at the remote end of the shaft 30 engages a rack gear assembly 33 which is fixed to the rear edge portion of the table 16.

The worm-and-wheel gears 28 and 29 and the rack-and-pinion gears 32 and 33 are not precision parts and therefore there is a measurable amount of slop or play which results in lost motion during operation of the transmission system. In other words, when the motor 25 is operated the rack 33 does not begin to move until all moving parts of the transmission system have turned to close into metal-to-metal contact from one gear tooth to the other throughout the train. If the motor 25 is stopped and turned in the opposite direction there is again a delay before the rack 33 begins to move as this lost motion is taken up. Great care is exercised in the precision crafting of gear train systems of prior art microscope positioning stages to eliminate this lost motion by insuring as much as possible that all of the gear teeth are always in continuous metal-to-metal contact throughout the system, but that is a very expensive solution to the lost motion problem. The positioning stage of the present invention tolerates all of that lost motion and avoids all of that expense.

Figure 3:
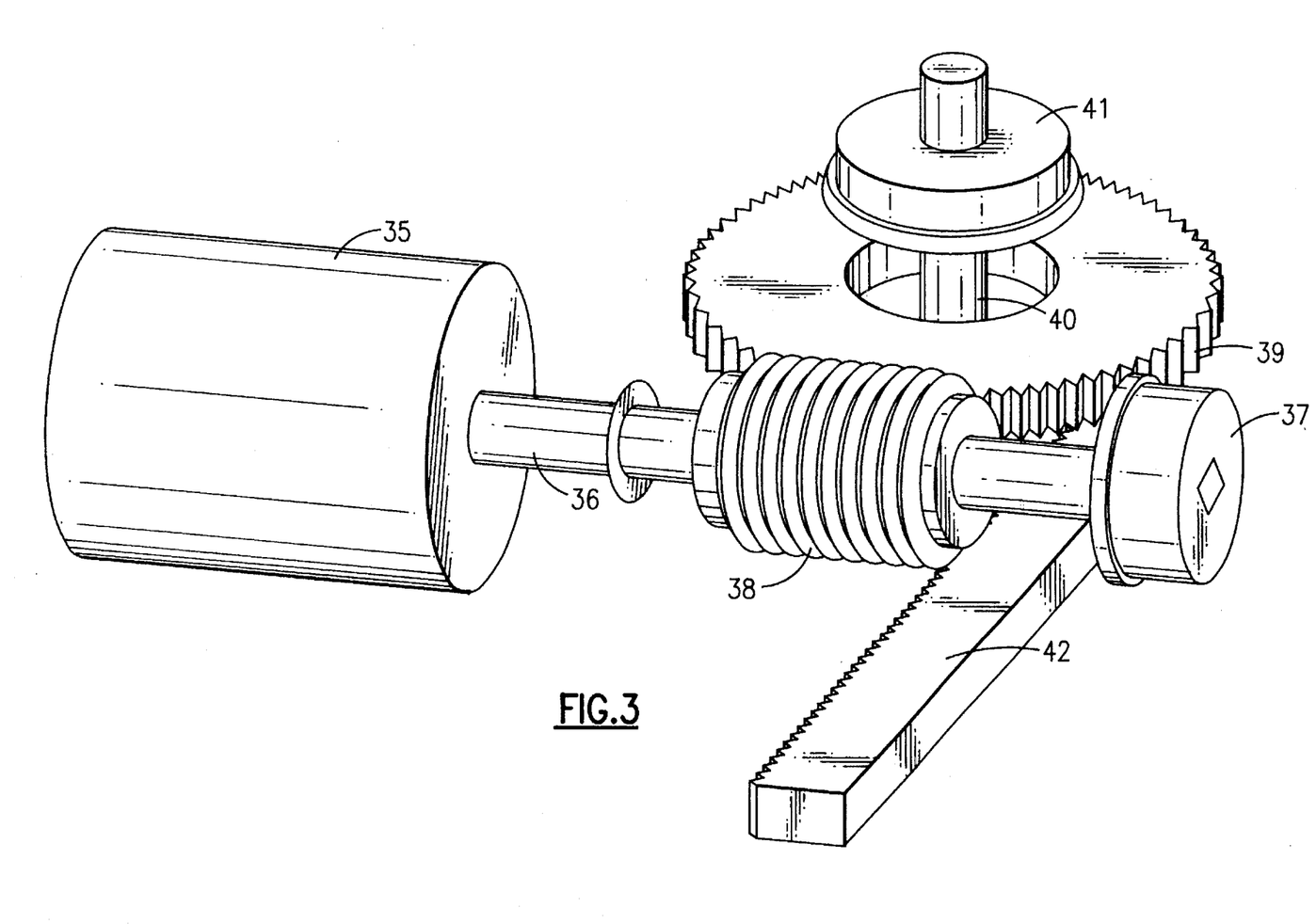
FIG. 3 is an enlarged fragmentary perspective of the gear train of the Y axis table of the FIG. 1 positioning stage.

In FIG. 3 the Y axis drive and its motion transmission system are shown. A simple direct current electric motor 35 has a shaft 36 mounted in a bearing 37 and equipped with a worm gear 38, all of which parts are mounted on the left end of the slide 13 (the motor 35 is just visible in FIG. 1). The worm gear 38 meshes with a worm wheel 39 having a pinion shaft 40 mounted in a bearing 41 and having a pinion gear (not visible) which meshes with a Y rack assembly 42 mounted on the frame 10. Again, the motor 35 transmits motion along the Y axis to the slide 13 upon which it is mounted with a measurable amount of lost motion in the gear train.

Figure 4:
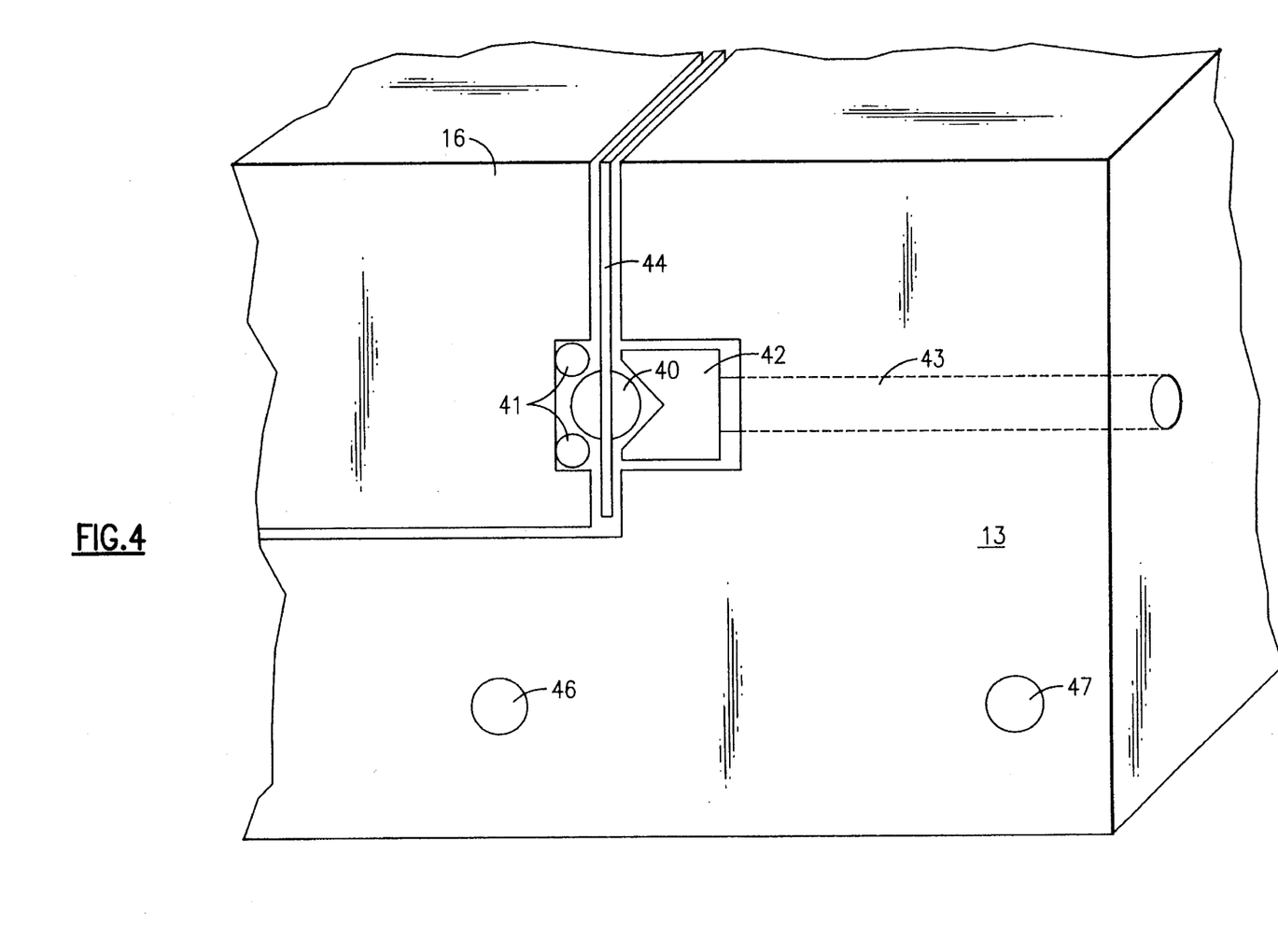
FIG. 4 is a schematic illustration of pressure bearing means associated with the slide and table of FIG. 1.

Adjustable pressure bearing means are provided for each of the slide 13 and the table 16 for preventing loss of placement of the table 16 at any predetermined position with respect to the frame 10. One of two such bearing means for the table 16 is illustrated in FIG. 4. A common bearing 40 rolls along bearing rod races 41 mounted on the edge of the table 16 and rolls also along an adjustable bearing race 42 mounted in the slide 13. The adjustable bearing race 42 can force the bearing 40 against the rod races 41 with more or less pressure by means of an adjustment set screw 43 accessible on the exterior of the slide 13.

A guide 44 is provided for the bearings 40 consisting of a strip of polytetrafluoroethylene with holes for the bearings 40. The strip also functions as a spacer between the slide 13 and the table 16. A similar adjustable bearing race is provided on the opposite edge of the table 16. Similar pairs of such adjustable bearing means are provided for the opposite edges of the slide 13 and the adjustment set screws 46 and 47 of one such pair are visible on-end in FIG. 4 perpendicular to the set screw 43.

Figure 5:
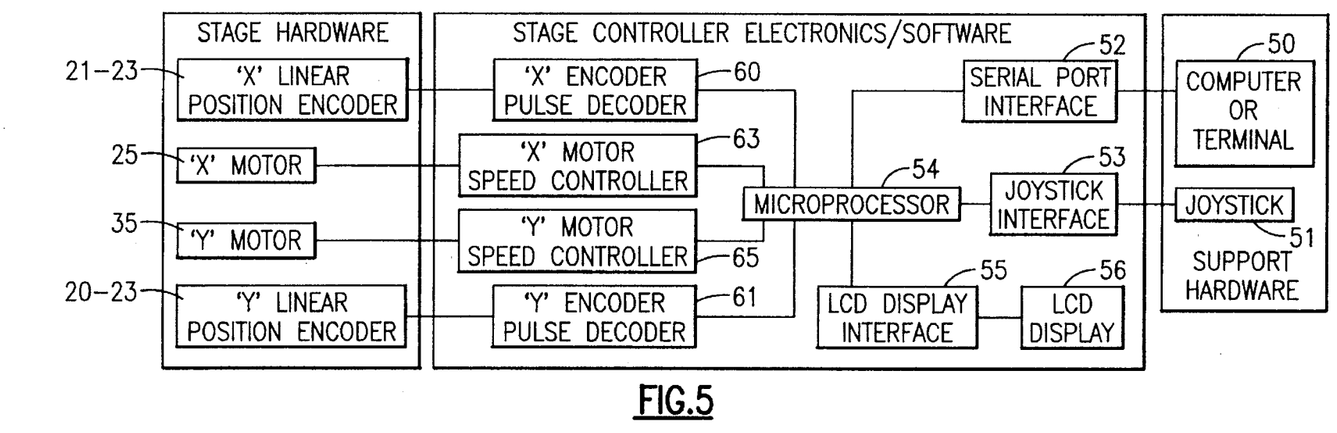
FIG. 5 is a block diagram of the control system for the FIG. 1 positioning stage.

The control system for the positioning stage of the embodiment of FIGS. 1 to 4 is shown in the block diagram of FIG. 5. By either a keyboard of a computer or terminal 50 or a joystick 51 instructions can be sent through interfaces 52 and 53 respectively to a microprocessor 54. Through an interface 55 a digital display 56 is presented of the control functions carried out by the microprocessor 54. The X axis linear position encoder pair 21–23 sends a quadrature encoded signal through an encoder pulse decoder 60 to the microprocessor 54 to indicate any slight change of linear position along the X axis of the table 16. Similarly the Y axis linear position encoder pair 20–23 sends a quadrature encoded signal through a Y axis encoder pulse decoder 61 to the microprocessor to indicate any slight change of position of the table 16 along the Y axis. In response to these signals and in accordance with the instructions given to it either by the computer-terminal 50 or joystick 51, the microprocessor sends operating signals through the X axis motor speed controller 63 to the X axis motor 25 and through the Y axis motor speed controller 65 to the Y axis motor 35. When the motors 25 and 35 operate they first take up all lost motion in their gear train but that is unknown and irrelevant to the encoder pairs 20–23 and 21–23. Only when the table 16 begins to move do the encoder pairs 20–23 and 21–23 begin to signal back to the microprocessor 54 that its instructions are being followed. Each of the motors 25 and 35 then operates until the table 16 is brought to its virtually exact position as instructed by the microprocessor 54 irrespective of lost motion in the transmission systems. If a reference point on the table 16 strays from the position predetermined by the microprocessor 54 the motors 25 and/or 35 will be operated, again taking up whatever lost motion they may involve, and only then do they nudge the table 16 back to the predetermined position.

It will be evident that as the parts of the respective motors and gear trains wear during prolonged use the lost motion inherent in them will increase. However because the stage is positioned quite independent of lost motion the problem of physical wear on the parts has virtually no effect on the accuracy of the positioning operation. The only effect is that the delay between commencement of motor operation and actual movement of the table 16 because somewhat longer because the lost motion is somewhat greater, but that longer delay is also unknown and irrelevant to the encoder pairs 20–23 and 21–23.

Figure 6:
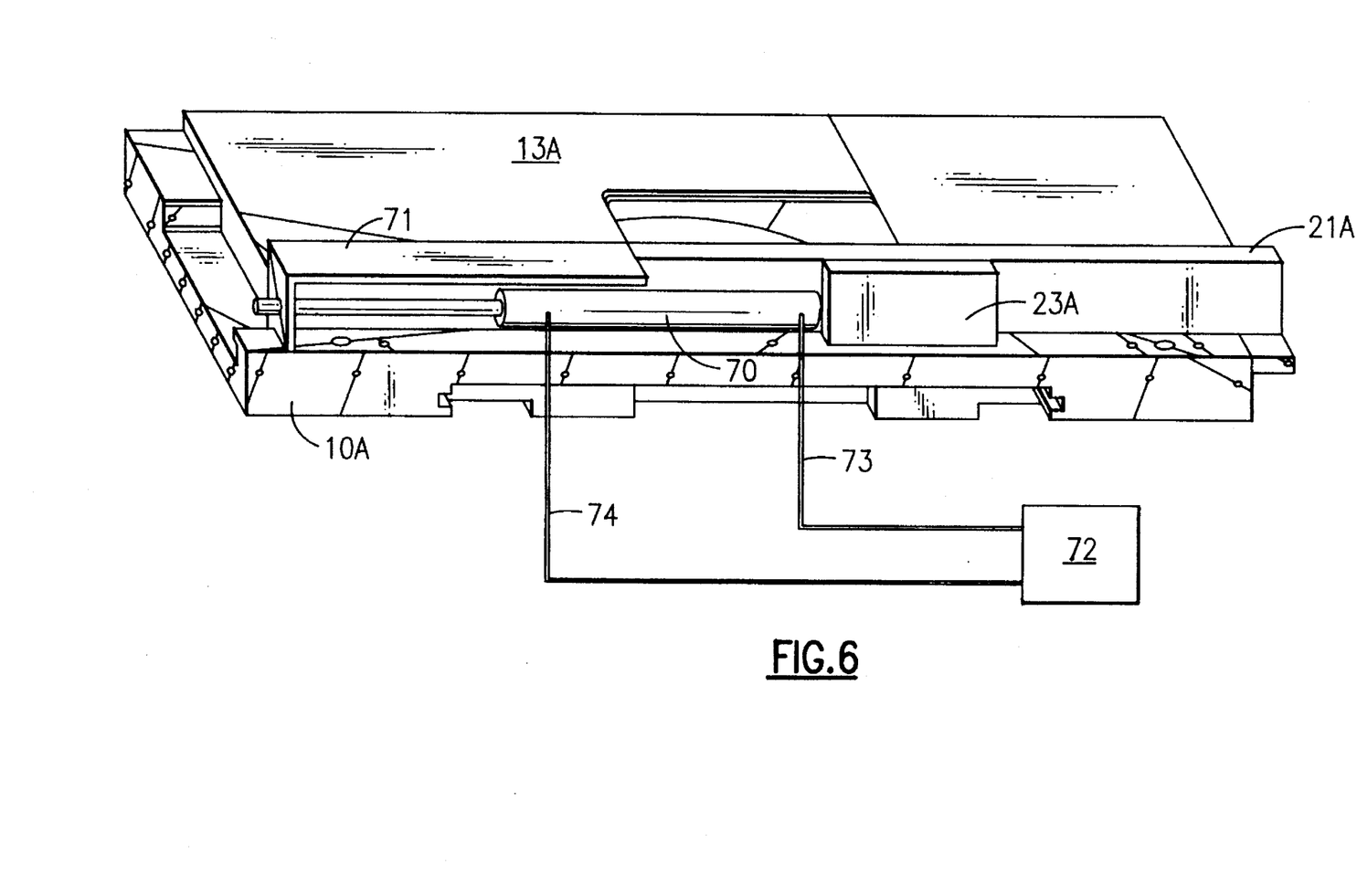
FIG. 6 is a perspective view of another embodiment of the positioning stage of the invention similar to that of FIG. 1 but employing a hydraulic drive and motion transmission system.
Figure 8:
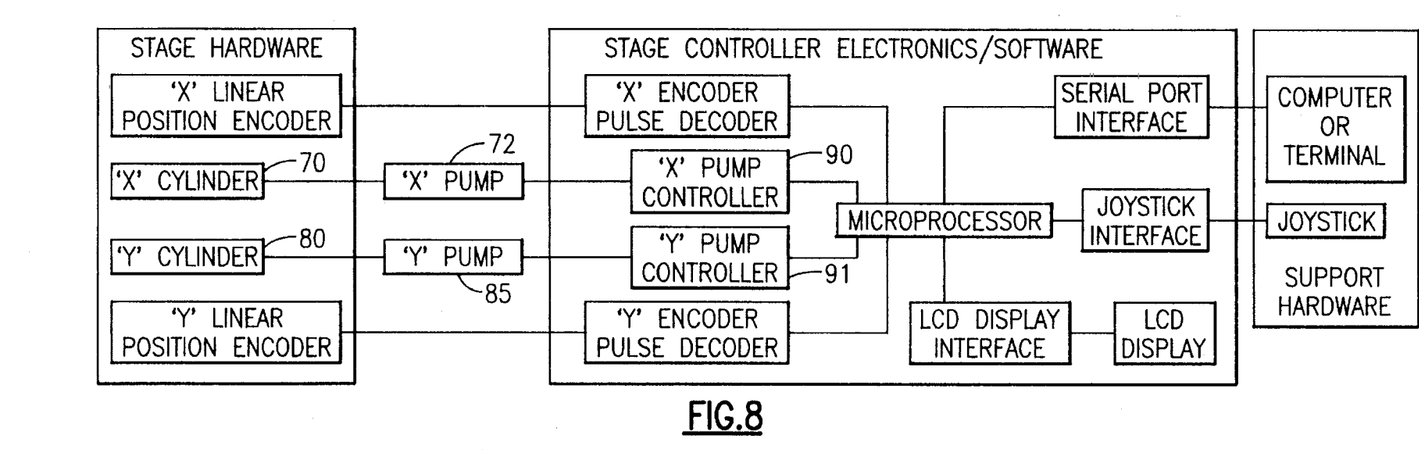
FIG. 8 is a block diagram of a control system for the positioning stage of FIGS. 6 to 7.

Turning now to the embodiment of FIGS. 6 and 8 it need be described only briefly because in virtually all respects it is the same as the embodiment of FIGS. 1 to 5, except that the electric motors and gear trains are replaced by hydraulic pumps and with hydraulic motors or cylinders. It is to be understood that wherever reference is made here to hydraulic equipment or functions, including reference thereto in the following claims, pneumatic means may be substituted for those which are hydraulic. Thus in FIG. 6 movement of a slide 13A along the X axis is accomplished by a double-acting hydraulic cylinder 70 under a cover 71. The drive for that cylinder is a schematically illustrated separate pump 72 connected to the cylinder by a pair of lines 73 and 74. The cylinder is double-acting so that pressures on opposite sides of its piston can be high and thus be more responsive to slight changes of relative pressure. As in the prior embodiment operation of this drive and motion transmission system causes the slide 13A to move back and forth along an X axis on a frame 10A. An encoder pair 21A–23A between the slide 13A and the frame 10A is the same as in the previous embodiment. In effect the pump 72 and cylinder 70 replace the motor 25 and its gear train in the previous embodiment.

Figure 7:
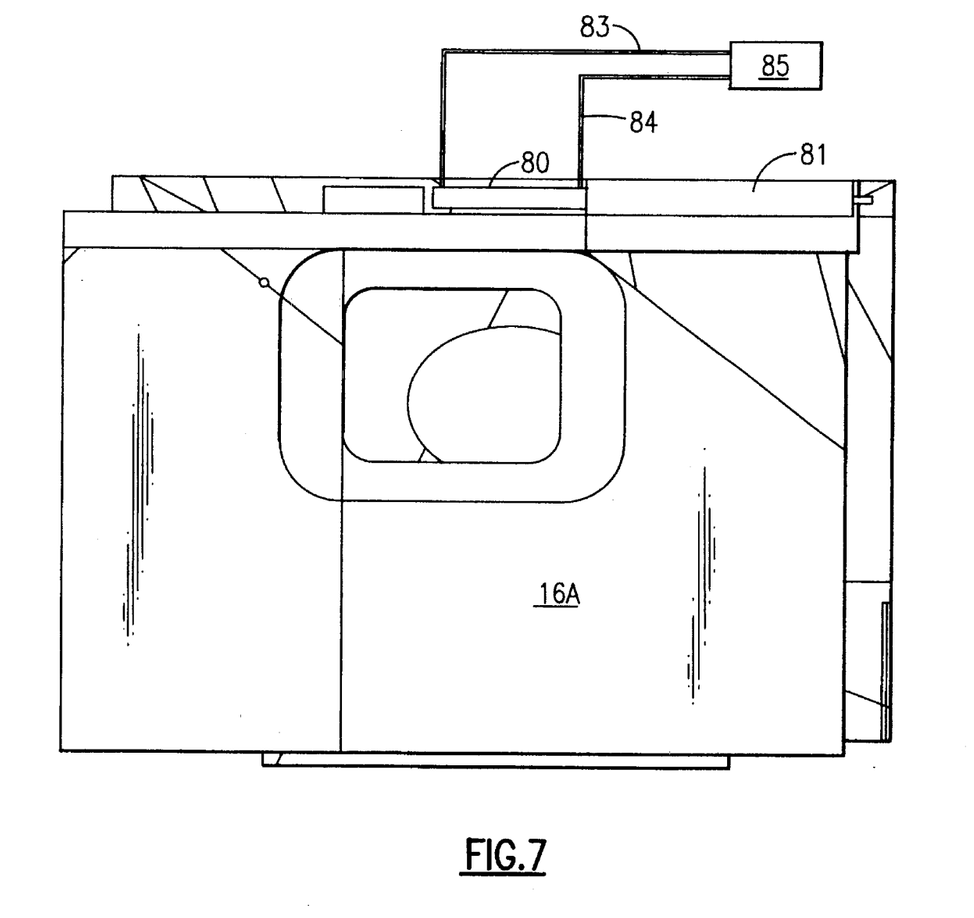
FIG. 7 is a plan view showing the hydraulic drive and transmission system for the table of the positioning stage of FIG. 6.

In FIG. 7 a hydraulic cylinder 80 under a cover 81 operates to move a table 16A back and forth along the Y axis on the slide 13A. The cylinder 81 operates through lines 83 and 84 which lead to a pump 85 which drives the cylinder 80. The pump 85 and cylinder 80 replace the motor 35 and its gear train in the previous embodiment to achieve motion back and forth along the X axis.

The control system for the embodiment of FIGS. 6 and 7 is shown in FIG. 8. It is the same as the control system of FIG. 5 except that the motor controllers are replaced by X and Y axes pump controllers 90 and 91 respectively and they operate the respective pumps 72 and 85 to operate the X axis cylinder 70 and the Y axis cylinder 80 respectively. In all other respects the control system and its advantages and functions are equivalent to those of the embodiment of FIGS. 1 to 6.

Figure 9:
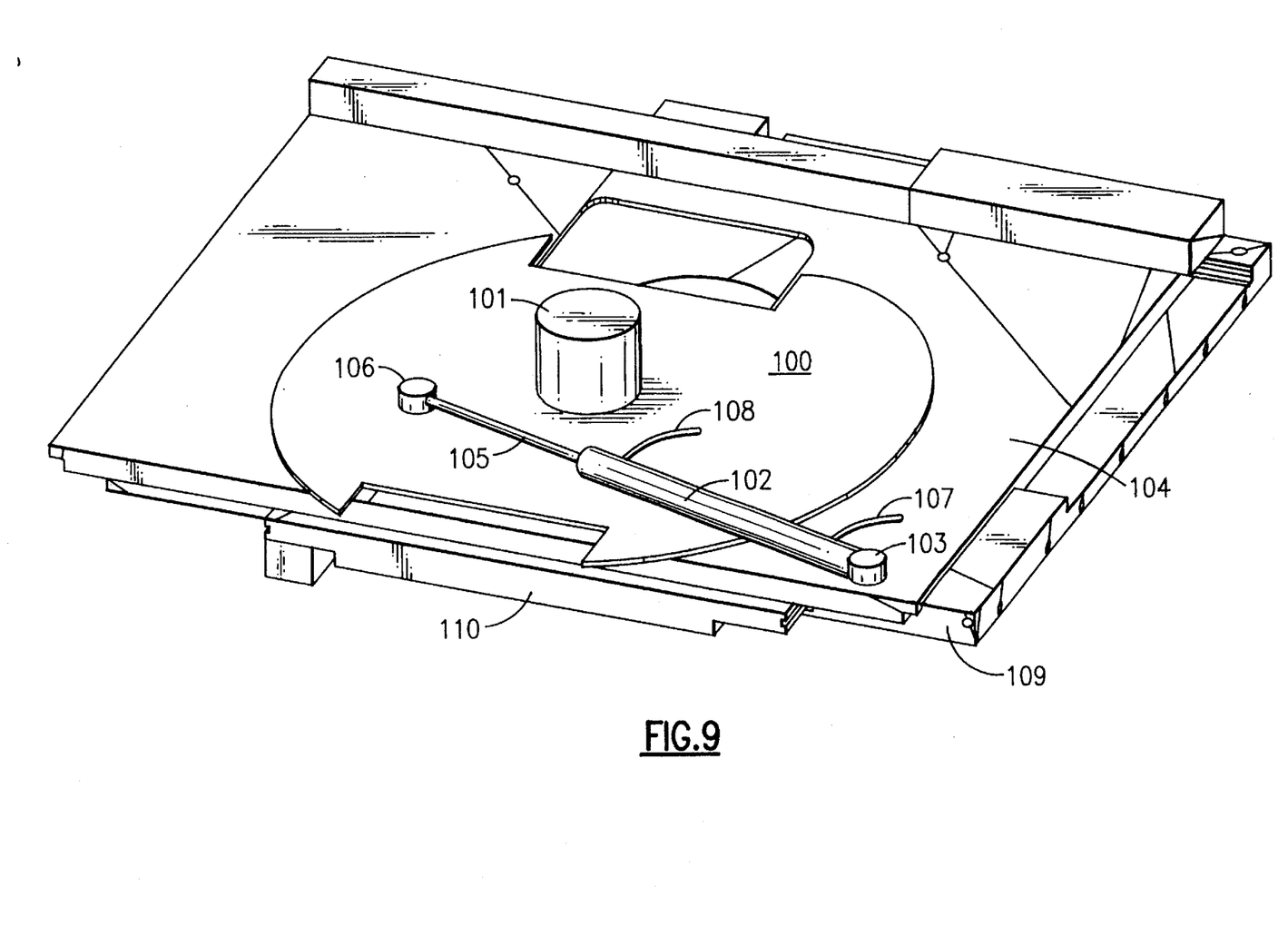
FIG. 9 is a perspective of another embodiment of the positioning stage of the invention showing an angularly movable table.

FIG. 9 illustrates an embodiment of the positioning stage of the invention where a table 100 is angularly movable rather than translatable. In the manner of a turntable it has a central axis on which a rotary encoder 101 is coaxially mounted. Angular motion of the table 100 is achieved by a cylinder 102 mounted by pivot 103 to a slide 104 with a piston 105 connected by a pivot 106 to the table 100. Hydraulic lines 107 and 108 lead to an appropriate pump (not shown). The slide 104 is translatable at right angles on another slide 109 which in turn is translatable on a frame 110. This serves to illustrate a form of the positioning stage of the invention where one of the degrees of freedom of the table is along an angular path of travel rather than a linear path of travel. In all other respects the encoder 101 is suitably paired with encoders elsewhere in the apparatus to sense the position of the table 100 in relation to some fixed frame so that lost motion of transmission systems therebetween is irrelevant.

Figure 10:
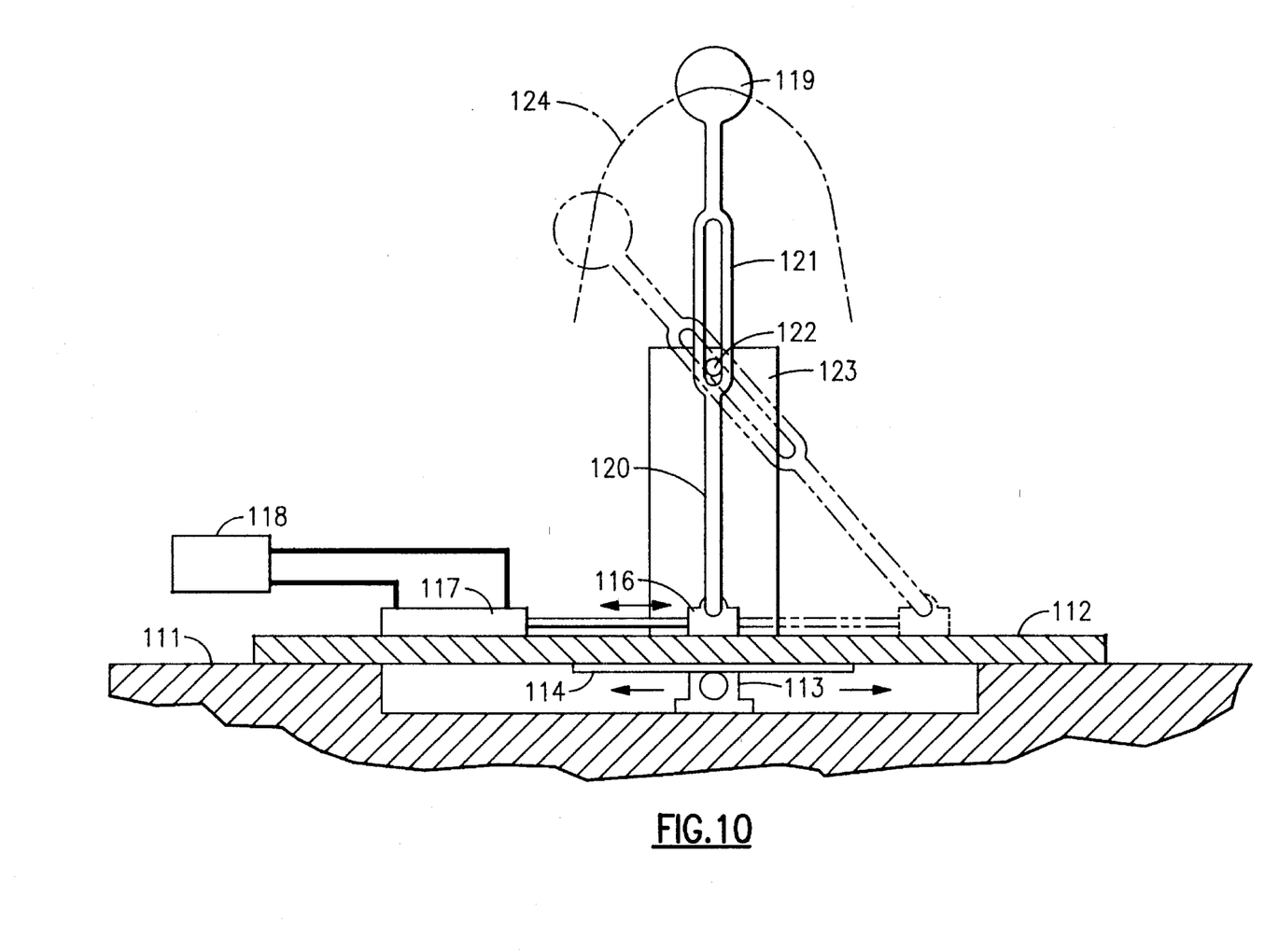
FIG. 10 is a schematic illustration of a third embodiment of a positioning stage of the invention illustrating curvilinear motion and a mix of hydraulic and electric drives and motion transmission systems.

Finally, in FIG. 10 a schematic embodiment of drive and motion transmission systems is shown which result in curvilinear movement of a table in relation to a frame 111. Here a first slide 112 is translatable by an electric motor 113 on the frame 111 driving a rack gear 114. On the first slide 112 a second slide 116 is translatable by a hydraulic cylinder 117 driven by a pump 118. A table 119 is pivotably connected to the second slide 116 by a rod 120 which includes a split track 121. A pin 122 extending from an upstanding component 123 of the first slide 112 extends into the track 121.

As will be apparent, reciprocation of the second slide 116 on the first slide 112 causes the table 119 to move in a parabolic curvilinear path of travel relative to the first slide 112 illustrated by the dot-dash line 124. The path of travel of the table 119 in relation to the frame 111 may be of an infinite number of configurations depending upon the movement of the first slide 112 on the frame 111 determined by the motor 113.

FIG. 10 serves to illustrate that hydraulic/pneumatic drive and transmission means may be mixed with motor and gear train drive and transmission means in the same positioning stage and the motion of the table may be neither straight linear nor circular but rather curvilinear. Otherwise the encoder systems applicable to the FIG. 10 apparatus are the same as those described in relation to the two previous embodiments so that the position of the table 110 may be accurately determined and fixed irrespective of lost motion through the various drives and gear trains.

The scope of this invention is to be determined from the following claims rather than the foregoing description of certain embodiments thereof.

I claim:

1. A positioning stage wherein a table is movable with respect to a frame within at least two predetermined degrees of freedom by a drive through a motion transmission system with lost motion therebetween, the improvement comprising a) a slide translatable on the frame along a first straight linear travel path, b) the table being translatable on the slide along a second straight linear travel path, c) encoder pair means on the table and frame for sensing motion of the table directly in reference to the frame and generating a signal indicating such motion independent of lost motion in the drive and transmission system, d) microprocessor means responsive to said encoder means signal for operating the drive to fix the table in a predetermined position with respect to the frame irrespective of lost motion in the drive and transmission system, and e) adjustable pressure bearing means associated with said slide and said table for guiding said slide and table and preventing loss of placement of said table at said predetermined position with respect to the frame.

2. A positioning stage according to claim 1 wherein the drive is an electric motor.

3. A positioning stage according to claim 1 wherein the motion transmission system is a gear train.

4. A positioning stage according to claim 3 wherein the gear train includes rack-and-pinion and worm-and-wheel gears.

5. A positioning stage according to claim 1 wherein the drive is a hydraulic pump.

6. A positioning stage according to claim 5 wherein the motion transmission system includes one of hydraulic motors and hydraulic cylinders.

7. A positioning stage according to claim 1 wherein a first drive for the slide is mounted on the frame and a second drive for the table is mounted on the slide.

8. A positioning stage according to claim 1 which includes a resilient bearing spacer between the frame and the slide and between the slide and the table.

9. A positioning stage wherein a table is movable with respect to a frame within at least three predetermined degrees of freedom by a drive through a motion transmission system with lost motion therebetween, the improvement comprising a) a first slide translatable on the frame along a first straight linear travel path, b) a second slide translatable on the first slide along a second linear travel path perpendicular to said first travel path and forming X and Y axes therewith, c) the table being rotatable on the second slide along an angular travel path, d) encoder pair means on the table and frame for sensing motion of the table directly in reference to the frame and generating a signal indicating such motion independent of lost motion in the drive and transmission system, e) microprocessor means responsive to said encoder means signal for operating the drive to fix the table in a predetermined position with respect to the frame irrespective of lost motion in the drive and transmission system, and f) adjustable pressure bearing means associated with said slide and said table for guiding said slide and table and preventing loss of placement of said table at said predetermined position with respect to the frame.

10. In a positioning stage wherein a table is movable with respect to a frame within two predetermined degrees of freedom by a drive through a motion transmission system with lost motion therebetween, the improvement comprising a) a slide translatable on the frame along a first straight linear travel path, b) the table being translatable on the slide along a second linear travel path perpendicular to said first travel path and forming X and Y axes therewith, c) a first encoder pair on the frame and slide and a second encoder pair on the slide and the table for sensing motion of the table directly in reference to the frame and generating a signal indicating such motion independent of lost motion in the drive and transmission system, d) said drive being electric motors on the first slide and said transmission system being rack-and-pinion and worm-and-wheel gears for transmitting motion from the frame to the slide and from the slide to the table, e) adjustable pressure bearing means for each of said slide and said table for guiding said slide and table and preventing loss of placement of said table at a predetermined position with respect to the frame, and f) resilient bearing spacers between the frame and the slide and between the slide and the table.

11. In a positioning stage wherein a table is movable with respect to a frame within three predetermined degrees of freedom by a drive through a motion transmission system with lost motion therebetween, the improvement comprising a) a first slide translatable on the frame along a first straight linear travel path, b) a second slide translatable on the first slide along a second straight linear travel path perpendicular to said first travel path and forming X and Y axes therewith, c) a table rotatable on the second slide along an angular travel path, d) a first encoder pair on the frame and first slide and a second encoder pair on the first and second slides and a third encoder pair on the second slide and the table for sensing motion of the table directly in reference to the frame and generating a signal indicating such motion independent of lost motion in the drive and transmission system, e) said drive being at least one hydraulic pump and said motion transmission system being one of hydraulic motors and hydraulic cylinders mounted on the first and second slides for transmitting motion respectively to the first and second slides and the table, f) adjustable pressure bearing means for each of the first and second slides for guiding said slides and preventing loss of placement of said table at a predetermined position with respect to the frame, and g) resilient bearing spacers between the frame and the first slide and between the first slide and the second slide.

12. A positioning stage wherein a table is movable with respect to a frame within at least two predetermined degrees of freedom by a drive through a motion transmission system with lost motion therebetween, the improvement comprising a) a slide translatable on the frame along a first travel path which is one of straight linear and angular, b) the table being translatable on the slide along a second travel path which is one of straight linear and curvilinear and angular, c) encoder pair means on the table and frame for sensing motion of the table directly in reference to the frame and generating a signal indicating such motion independent of lost motion in the drive and transmission system, d) microprocessor means responsive to said encoder means signal for operating the drive to fix the table in a predetermined position with respect to the frame irrespective of lost motion in the drive and transmission system, and e) adjustable pressure bearing means associated with said slide and said table for guiding said slide and table and preventing loss of placement of said table at said predetermined position with respect to the frame.

* * * * *